US006969026B2

(12) United States Patent
Kayama

(10) Patent No.: US 6,969,026 B2
(45) Date of Patent: Nov. 29, 2005

(54) AIRCRAFT

(76) Inventor: Tsuneo Kayama, 4-10, Ikuta, 3-chome, Tama-ku, Kawasaki-shi, Kanagawa, 214-0038 (JP)

( * ) Notice: Subject to any disclaimer, the term of this patent is extended or adjusted under 35 U.S.C. 154(b) by 0 days.

(21) Appl. No.: 10/740,105

(22) Filed: Dec. 17, 2003

(65) Prior Publication Data
US 2004/0195433 A1    Oct. 7, 2004

(30) Foreign Application Priority Data
Dec. 20, 2002    (JP) .............................. 2002-370015

(51) Int. Cl.$^7$ ............................................. B64C 1/00
(52) U.S. Cl. .................... 244/13; 244/45 R; 244/117 R
(58) Field of Search .......................... 244/13, 15, 12.1, 244/45 R, 117 R

(56) References Cited

U.S. PATENT DOCUMENTS

| D120,187 S | * | 4/1940 | Silverstein | ................. D12/335 |
| 2,406,625 A | * | 8/1946 | Oglesby | ..................... 244/13 |
| 2,460,804 A | * | 2/1949 | Brentnall | ..................... 244/13 |
| 5,071,088 A | * | 12/1991 | Betts | ......................... 244/12.1 |
| 5,145,129 A | * | 9/1992 | Gebhard | .................... 244/12.5 |
| 6,367,738 B1 | * | 4/2002 | Wadleigh | .................... 244/13 |

* cited by examiner

*Primary Examiner*—J. Woodrow Eldred
(74) *Attorney, Agent, or Firm*—Jordan and Hamburg LLP

(57) ABSTRACT

The aircraft has a main body 1 and a pair of sub bodies 4 and 5 positioned substantially in parallel with the main body 1 and respectively in both of the left and right sides of the main body 1. A canard 3 and main wings 8 and 9 each have a central portion fixed to the main body 1 and portions fixed respectively to the sub bodies 4 and 5, near left and right ends of the wings. Engines 6 and 7 are respectively mounted on outer surfaces of the sub bodies 4 and 5. The sub bodies 4 and 5 are thinner than the main body 1. The canard 3, which is positioned closest to the fore end of the aircraft, has a shorter wing span than the other wings. The sub bodies 4 and 5 contain fuel. The fuel is supplied to the engines 6 and 7 assuring high safety. The main wings 8 and 9 are positioned, shifted respectively forth and back relative to the main body 1. Therefore, stability is not impaired even if cargos are loaded into the main body over a wide range from the bow to the tail.

12 Claims, 24 Drawing Sheets

AIRCRAFT

BACKGROUND OF THE INVENTION

1. Field of the invention

The present invention relates to a highly safe and stable aircraft having a structure in which a main body and sub bodies positioned in both sides of the main body are linked to each other by plural wings.

2. Description of the Related Art

A canard wing is positioned in the front of a main wing. The canard wing creates an upward lift to assist a lift of the main wing, and thus functions to improve stability of an aircraft. In a conventional aircraft using a canard, the canard is sufficiently short compared with the main wing, and the main wing adopts of a sweptback wing style, to reduce influence from turbulence occurring behind the canard (Japanese Patent Application Laid-Open Publication No. 2002-276033).

The present inventor has made more efficient use of a canard described above and developed aircrafts with high safety and stability (ref. Japanese Patent Applications No. 11-037965 and 2001-344119). Flight tests using scale-down models thereof have proved extremely high stability. To practice these models as passenger aircrafts and transport aircrafts, more specific developments in their structures have been demanded.

SUMMARY OF THE INVENTION

To solve the conventional problems as mentioned above, the present invention provides a highly safe and stable aircraft having a structure in which a main body and sub bodies positioned in both sides of the main body are linked to each other by plural wings.

According to the present invention, there is provided an aircraft comprising a main body, a first pair of sub bodies positioned respectively in left and right sides of the main body and substantially in parallel with the main body, plural wings which are fixed to the main body at central portions of the wings and are also fixed to the sub bodies at those portions of the wings that are close to both left and right ends of the wings, and engines respectively mounted on outer surfaces of the sub bodies, wherein the sub bodies are thinner than the main body, one of the wings, which is positioned closest to the fore end of the aircraft among the wings and serves as a first canard, has a shorter wing span than the other wings, and fuel is contained in the sub bodies and is supplied to the engines mounted on the sub bodies.

Further, in the aircraft, further comprising another pair of sub bodies positioned in parallel with the main body, respectively in both left and right sides of the main body and the first pair of sub bodies.

Further, in the aircraft, wherein the plural wings are positioned respectively at different heights where the aircraft is observed in a front view.

Further, in the aircraft wherein a second canard having a longer wing span than the first canard is provided on outer surfaces of the sub bodies, near both left and right ends of the first canard.

Further, in the aircraft wherein plural first canards are provided.

Further, in the aircraft wherein a detachable mechanism is provided to separate a part of the first canard from the main body or the sub bodies.

Further, in the aircraft wherein a foldable mechanism which allows a part of the sub bodies to be folded so as to widen the distance between the main body and the part of the sub bodies is provided at a spot at which the part of the first canard is separated.

Further, in the aircraft wherein the sub bodies are equipped with wings, which has a rotation axis vertical to the sub bodies and rotates in a plane parallel to the other wings, the small wing being fixed in an arbitrary attitude during flight.

Moreover according to the present invention, there is provided an aircraft comprising, a main body, a pair of sub bodies positioned respectively in left and right sides of the main body and substantially in parallel with the main body, plural wings which are fixed to the main body at central portions of the wings and are also fixed to the sub bodies at those portions of the wings that are close to both ends of the wings, and engines respectively mounted on outer surfaces of the sub bodies, wherein, the sub bodies are thinner than the main body, and in a side close to the fore end of the aircraft, spaces are provided between the main body and the sub bodies, and canards each having a long wing span are provided on the outer surfaces of the sub bodies in both sides of the spaces.

Further, in the aircraft wherein one or more rods linking the main body to the sub bodies are provided in the spaces as linking parts.

Further, in the aircraft fuel is contained in the sub bodies and is supplied to the engines mounted on the sub bodies.

Further, in the aircraft further comprising another pair of sub bodies positioned in parallel with the main body, respectively in both left and right sides of the main body and the first pair of sub bodies.

Further, in the aircraft wherein the plural wings are positioned respectively at different heights where the aircraft is observed in a front view.

Further, in the aircraft wherein a foldable mechanism which allows a part of the sub bodies to be folded so as to widen the distance between the main body and the part of the sub bodies is provided at a spot at which the part of the first canard is separated.

Moreover according to the present invention, there is provided an aircraft comprising, a main body, a pair of sub bodies positioned respectively in left and right sides of the main body and substantially in parallel with the main body; and plural wings which are fixed to the main body at central portions of the wings and are also fixed to the sub bodies at those portions of the wings that are close to both ends of the wings, wherein, the sub bodies are thinner than the main body, and one of the wings, which is a canard and is positioned closest to the fore end of the aircraft among the plural wings, has a shorter wing span than the other wings and is provided with a foldable mechanism which allows a part of the sub bodies to be separated and folded, between the plural wings.

Further, in the aircraft, fuel is contained in the sub bodies and is supplied to the engines mounted on the sub bodies.

Further, in the aircraft further comprising another pair of sub bodies positioned in parallel with the main body, respectively in both left and right sides of the main body and the first pair of sub bodies.

Further, in the aircraft wherein the plural wings are positioned respectively at different heights where the aircraft is observed in a front view.

Further, in the aircraft wherein a second canard having a longer wing span than the first canard is provided on outer surfaces of the sub bodies, near both left and right ends of the first canard.

Further, in the aircraft wherein plural first canards are provided.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Best modes of carrying out the present invention will be described in further detail using various embodiments with references to the accompanying drawing.

(Embodiment) 1

Figure 1:
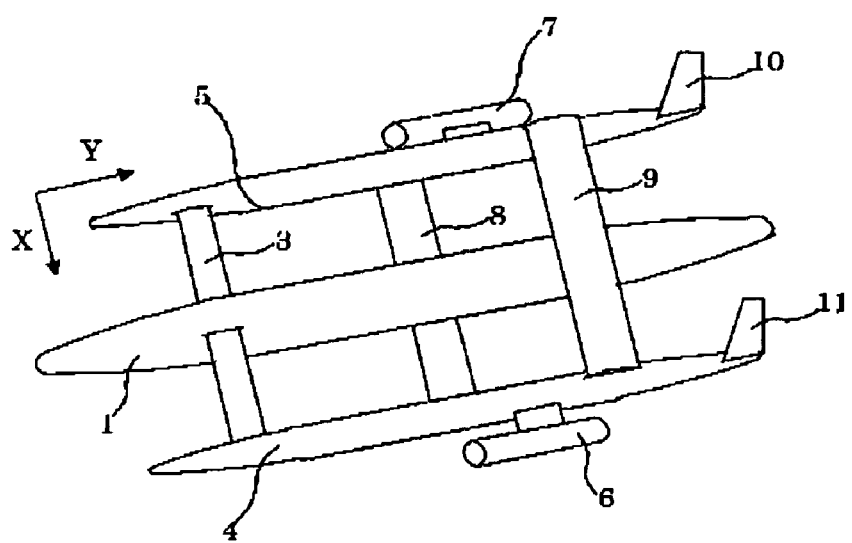
FIG. 1 is a perspective view of the aircraft according to the embodiment 1.

In FIG. 1, the aircraft has a main body 1 and a pair of sub bodies 4 and 5 positioned substantially in parallel with the main body 1 and respectively in both of the left and right sides of the main body 1. The aircraft also has three wings 3, 8, and 9 each having a central portion fixed to the main body 1 and portions fixed respectively to the sub bodies 4 and 5, near left and right ends of the wings. Engines 6 and 7 are respectively mounted on outer surfaces of the sub bodies 4 and 5. The sub bodies 4 and 5 are respectively provided with tail wings 10 and 11.

The sub bodies 4 and 5 are thinner than the main body 1. Each of the sub bodies 4 and 5 internally contains fuel not shown. Fuel contained in the sub body 4 is supplied to the engine 6 mounted on the sub body 4, as well as fuel in the sub body 5 to the engine 7. Therefore, no piping for supplying fuel is provided around the main body 1. The wing 3 that is positioned closest to the front end of the aircraft is a canard. The other wings 8 and 9 are main wings. The wing 3 has a smaller wing span than the other wings 8 and 9. The size of each wing in the direction of arrow X in the drawing will be hereinafter called a wing length. Also, the size of each wing in the direction of arrow Y in the drawing is called a wing span.

In this aircraft, the sub bodies 4 and 5 link the three wings 3, 8, and 9, improving mechanical strength. In addition, the main wings 8 and 9 are positioned, shifted respectively forth and back relative to the main body 1. Stability is therefore not impaired even if the main body 1 is loaded inside over a wide range from the bow to the tail thereof. That is, the structure is designed so that the aircraft can fly stably even when the center of gravity of the aircraft shifts.

If the engines 6 and 7 are mounted on the outsides of the sub bodies 4 and 5, the sub bodies work as sound barriers between the main body 1 and the engines 6 and 7. That is, noise from the engines 6 and 7 are shut off by the sub bodies 4 and 5, so that the noise level is maintained low in the cockpit and passenger cabin in the main body 1. In addition, these parts that may cause fire can be kept distant from the passenger cabin. If fuel is thus contained in the sub bodies and supplied therefrom to the engines, no fuel piping is provided near the main body so that safety is improved much more. The engines 6 and 7 are suitably jet engines or rocket engines. Of course, engines for driving propellers may be used.

(Embodiment) 2

Figure 2:
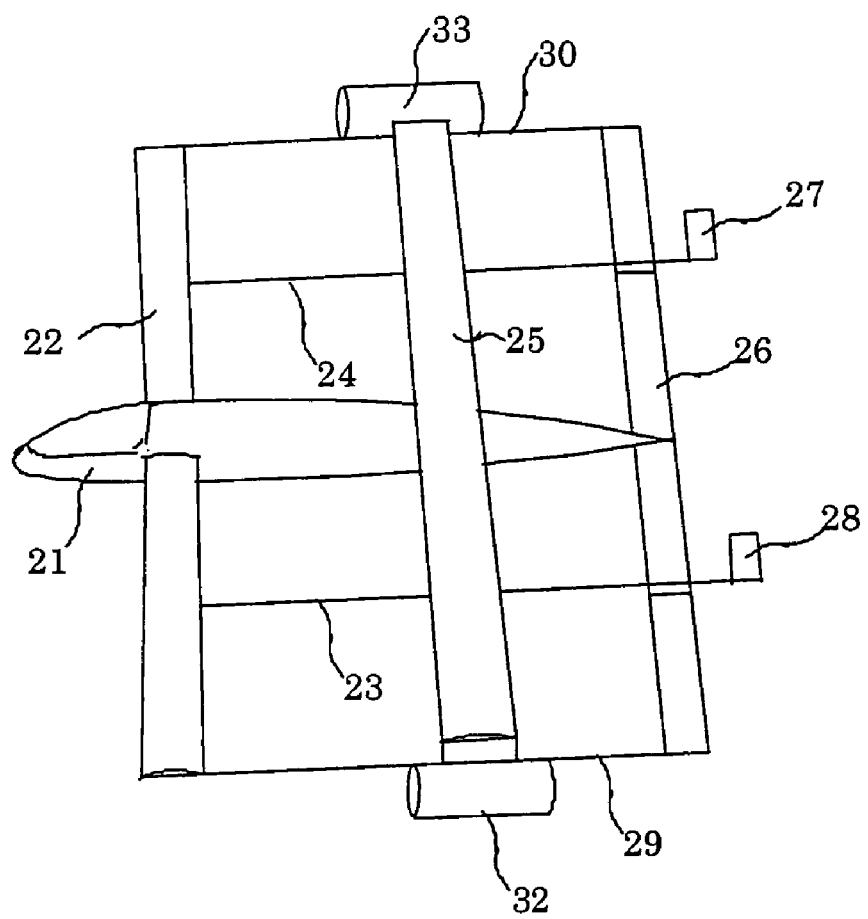
FIG. 2 is an exemplary perspective view of an aircraft having wings with a high aspect ratio.

The aircraft shown in FIG. 2 has three wings 22, 25, and 26 each having a high aspect ratio. This aircraft has another pair of sub bodies 29 and 30 which are positioned substantially in parallel with the main body 21, respectively in both the left and right sides of the main body 21 and sub bodies 23 and 24. The sub bodies 23 and 24 are respectively provided with tail wings 27 and 28. Engines 32 and 33 are respectively mounted on the outsides of the sub bodies 29 and 30. Alternatively, these engines may be mounted on the sub bodies 23 and 24. Fuel may be contained in whichever pair of sub bodies the engines are mounted on. The rest pair of sub bodies may each have a simple rod-like or plate-like shape. The wings 22, 25, and 26 each having a high aspect ratio have poor strength. The number of sub bodies are thus increased to support these wings at more plural positions. Accordingly, deformation of wings due to external force can be prevented, and strength of the wings can be raised. If plural wings each having a high aspect ratio can be used, the lift increases so that stable flight is possible at a low speed.

Figure 3:
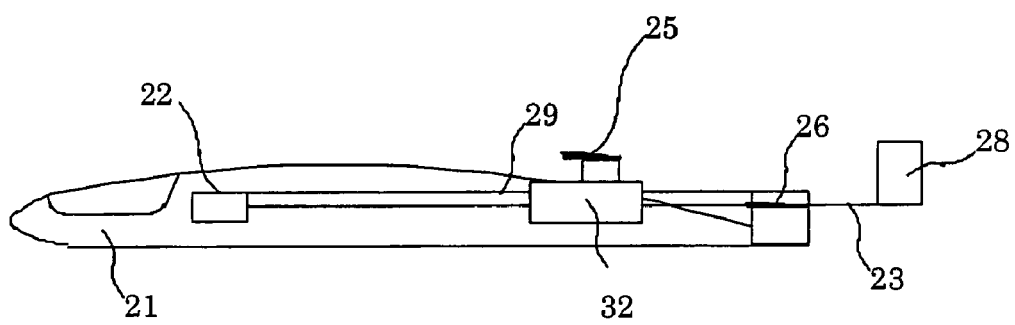
FIG. 3 is a side view of the aircraft according to the embodiment 2.
Figure 4:
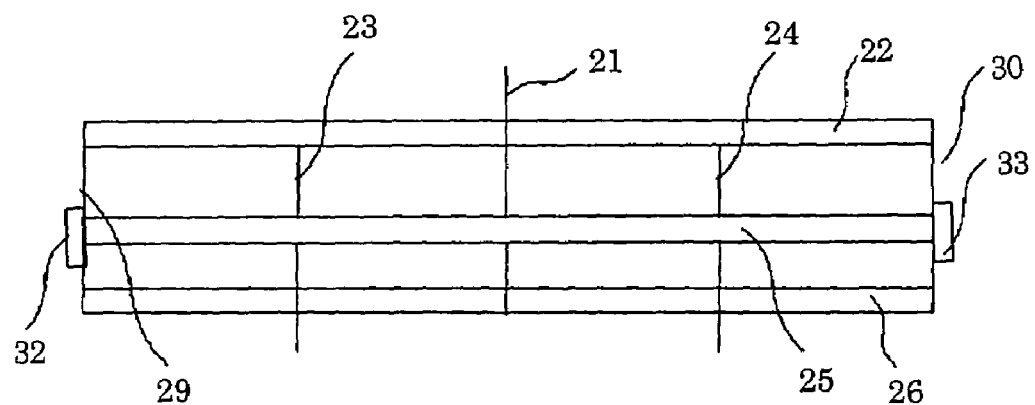
FIG. 4 is a schematic top view of the aircraft shown in FIG. 2.
Figure 5:
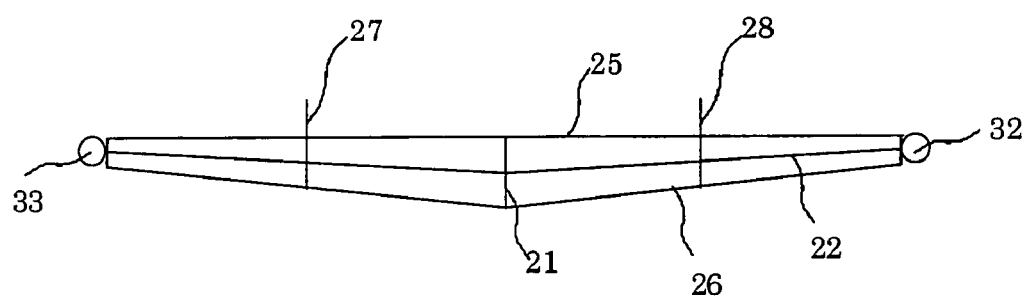
FIG. 5 is a schematic front view of the aircraft shown in FIG. 2.
Figure 6:
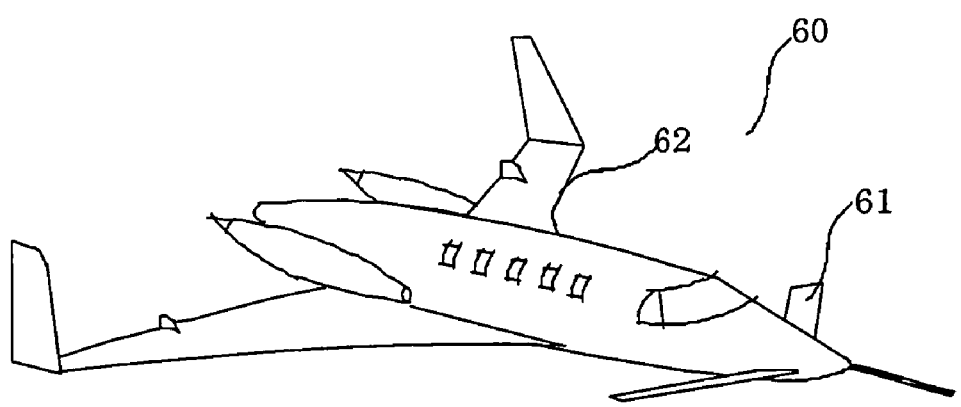
FIG. 6 is a perspective view showing a comparable example of a conventional aircraft.

As shown in FIG. 3, the three wings 22, 25, and 26 of the aircraft described above are positioned at respectively different heights. As shown in FIG. 6, the canard 61 of a conventional aircraft 60 has a small size and a semi-retractable structure. In addition, the main wing 62 has a sweptback angle to raise flight stability. Meanwhile, in the aircraft according to the present invention, the wing 22 (canard) has a longer wing length than that of the conventional aircraft. Therefore, in FIG. 2, an air flow (slip stream) behind the wing 22 may become turbulence and may influence adversely the performance of the main wings 25 and 26. Hence, as shown in FIG. 3, the three wings 22, 25, and 26 are positioned at respectively different heights. In this structure, the wings each are hardly influenced from any other wings positioned in their fore side. Where the aircraft in this embodiment is viewed from upside, the wings are each narrow and long and are positioned parallel to each other, as is shown in FIG. 4. Where this aircraft is viewed from the bow toward the tail wing, the wings as a whole are respectively positioned at different heights, as is shown in FIG. 5.

(Embodiment) 3

Figure 7:
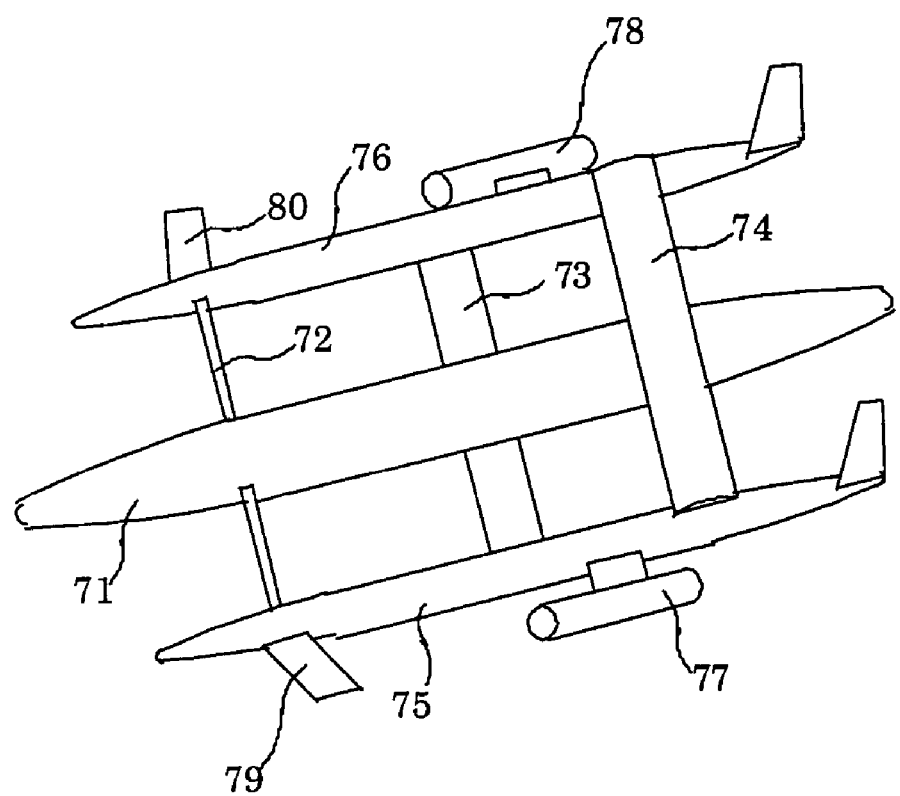
FIG. 7 is a perspective view of the aircraft according to the embodiment 3.

The aircraft shown in FIG. 7 also has a main body 71, sub bodies 75 and 76, wings 72, 73, and 74, and engines 77 and 78. In this aircraft, second canards 79 and 80 each having a greater wing span than the canard wing 72 (hereinafter called a first canard 72) are respectively provided on outer surfaces of the sub bodies 75 and 76, near both the left and right ends of the first canard 72. Since there is no wing in the rear side of the second canards 79 and 80, the wing spans of these wings are widened so that lift is shared between these wings. Inversely, if the wing spans of the second canards are narrowed sufficiently, the air flow is not disturbed, and influences on the wings in the rear side can be reduced. The first canard 72 is not provided with a flap or an aileron but has a thin shape which causes less resistance. The second canards 79 and 80 are installed on the sub bodies 75 and 76 such that the second canards can be driven like flaps. This structure enables adjustment of lift.

(Embodiment) 4

Figure 8:
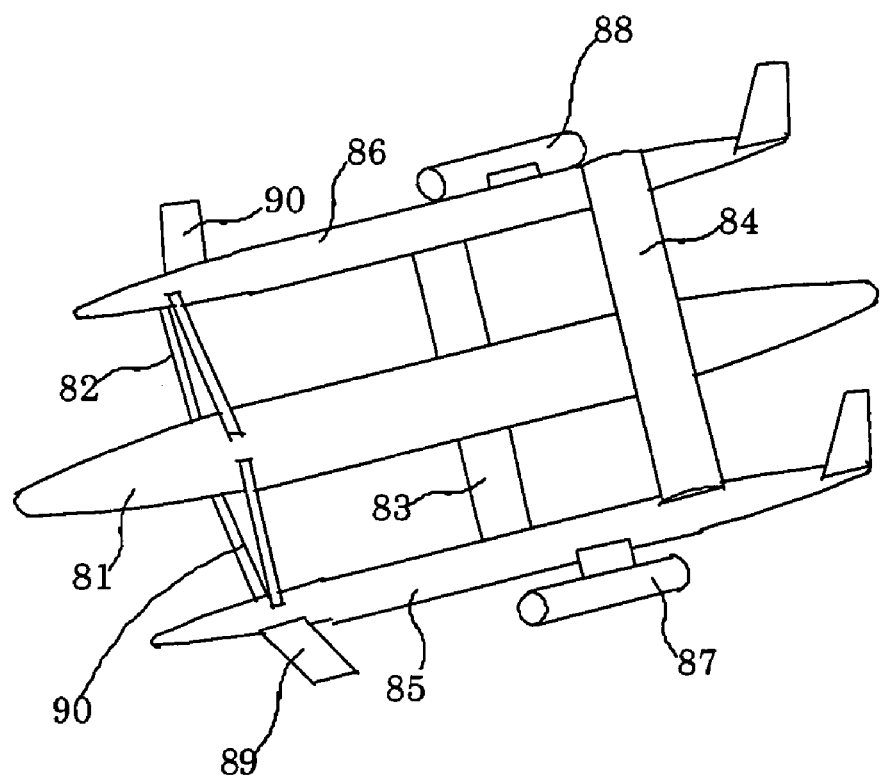
FIG. 8 is a perspective view where canards are installed in upper and lower sides to reinforce the structure linking the main body and the sub bodies.

This embodiment shown in FIG. 8 reinforces the part of the first canard 72 in the embodiment shown in FIG. 7. This embodiment has a main body 81, sub bodies 85 and 86, main wings 83 and 84, engines 87 and 88, first canards 82 and 91, and second canards 89 and 90. The first canards 82 and 91 are so narrow and thin that use of only one single first canard may result in poor strength. Hence, the two first canards 82 and 91 are provided in upper and lower sides.

(Embodiment) 5

Figure 9:
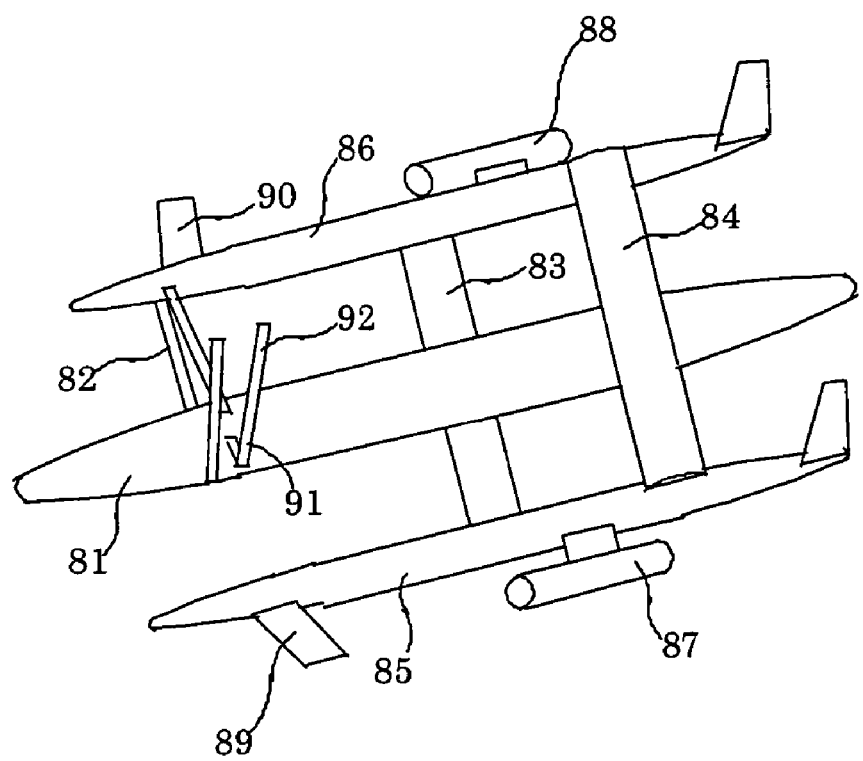
FIG. 9 is a perspective view of the aircraft according to the embodiment 5 when cargos are loaded or unloaded.
Figure 10:
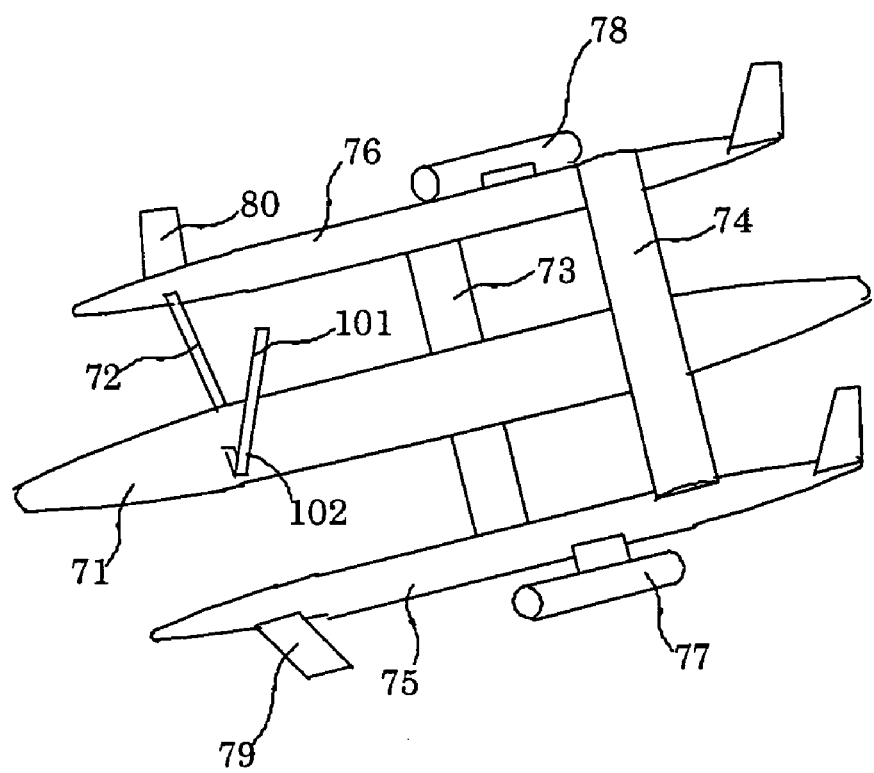
FIG. 10 is a perspective view of the aircraft according to the embodiment 4 when cargos are loaded or unloaded.

The embodiment shown in FIG. 9 is a modification of the aircraft according to the embodiment shown in FIG. 8. This aircraft has a main body 81, sub bodies 85 and 86, main wings 83 and 84, engines 87 and 88, first canards 82 and 91, and second canards 89 and 90. The main body 81 is loaded with cargos. If the first canard 91 is positioned between the main body 81 and the sub body 85, this canard will be an obstacle when loading or unloading cargos. Hence, a detachable mechanism which is not shown and a foldable mechanism 93 are provided in order that an end 92 of the first canard 91, as well as that of the second canard, can be separated from the sub body 85. The detachable mechanism serves to separate parts of the canards from the main body or sub body. Bolts and nuts may be used for the detachable mechanism. Hinges may be used for the foldable mechanism 93. In this way, transportation vehicles for cargos can come up to stop on the side of the main body 81. Alternatively, the detachable mechanism may be provided at the junction between the first canard and the main body 81. FIG. 10 shows an example in which the first canard 101 according to the embodiment shown in FIG. 7 is provided with a foldable mechanism 102.

(Embodiment) 6

Figure 11:
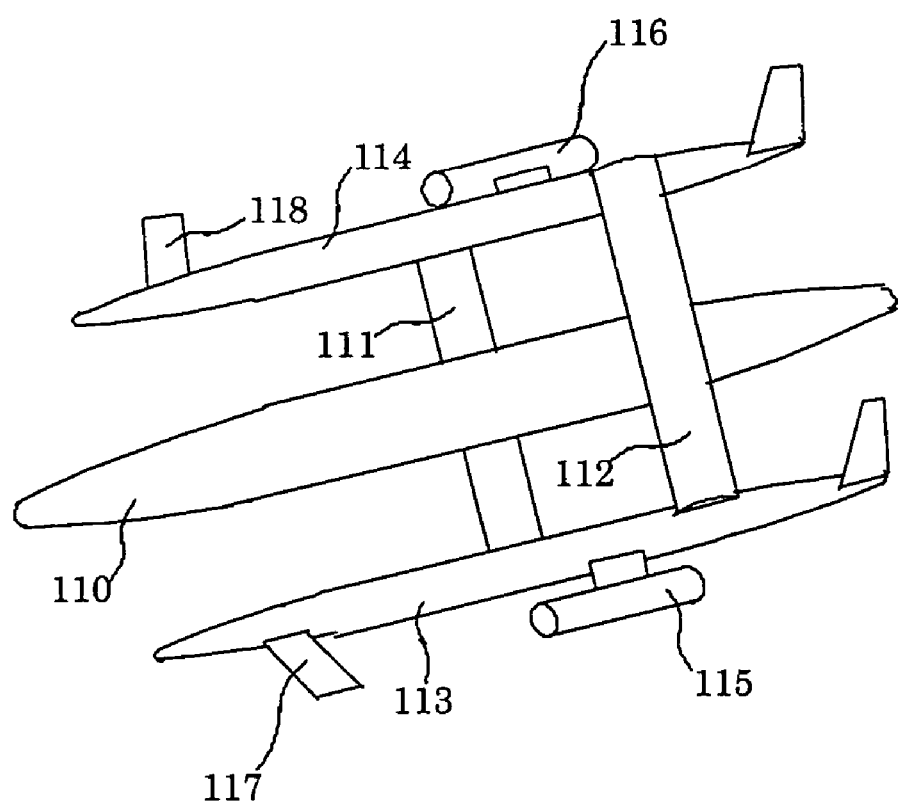
FIG. 11 is a perspective view of the aircraft according to the embodiment 6.

The aircraft shown in FIG. 11 has a main body 110, sub bodies 113 and 114, main wings 111 and 112, engines 115 and 116, and canards 117 and 118. In this embodiment, the canard 117 or 118 is not provided inside the sub bodies 113 and 114. In the side close to the bow of the aircraft, spaces are provided between the main body 110 and the sub bodies 113 and 114. In both outer sides of these spaces, the canards 117 and 118 each having a long wing span are provided on the outer surfaces of the sub bodies 113 and 114. The canards 117 and 118 are installed only on the outer sides of the sub bodies 113 and 114. Therefore, cargos can be loaded and unloaded easily by vehicles. In addition, there is nothing between the main body 110 and the sub bodies 113 and 114, so it is needles to care about turbulence behind the canards.

(Embodiment) 7

Figure 12:
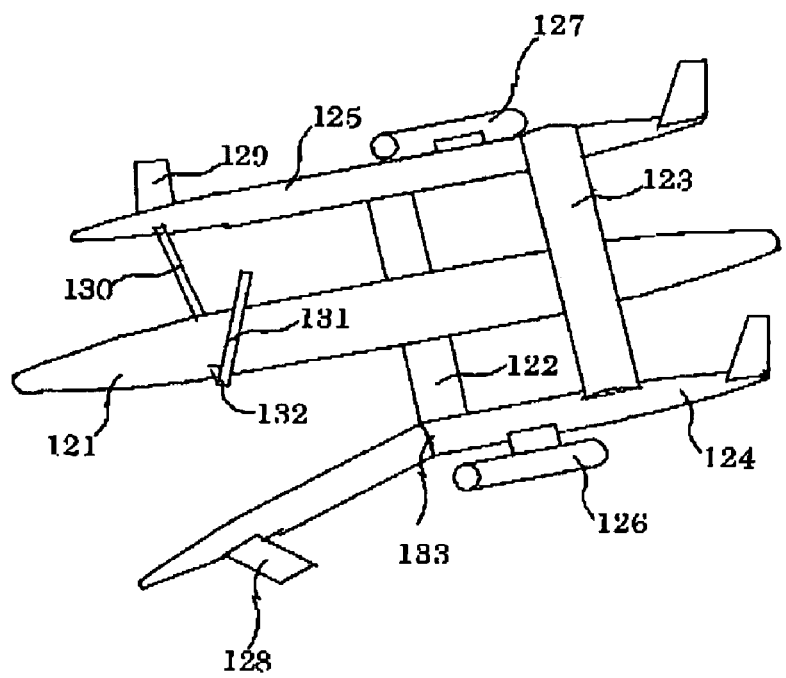
FIG. 12 is a perspective view of the aircraft according to the embodiment 7 when cargos are loaded or unloaded.

The aircraft shown in FIG. 12 has a main body 121, sub bodies 124 and 125, main wings 122 and 123, engines 126 and 127, first canards 130 and 131, and second canards 128 and 129. A part of the canard 131 can be separated and folded by a foldable mechanism 132. Further, another foldable mechanism 133 which allows a part of the sub body 124 to fold is provided to widen the distance between the main body 121 and the sub body 124. This allows cargo transportation vehicles to work more easily.

(Embodiment) 8

Figure 13:
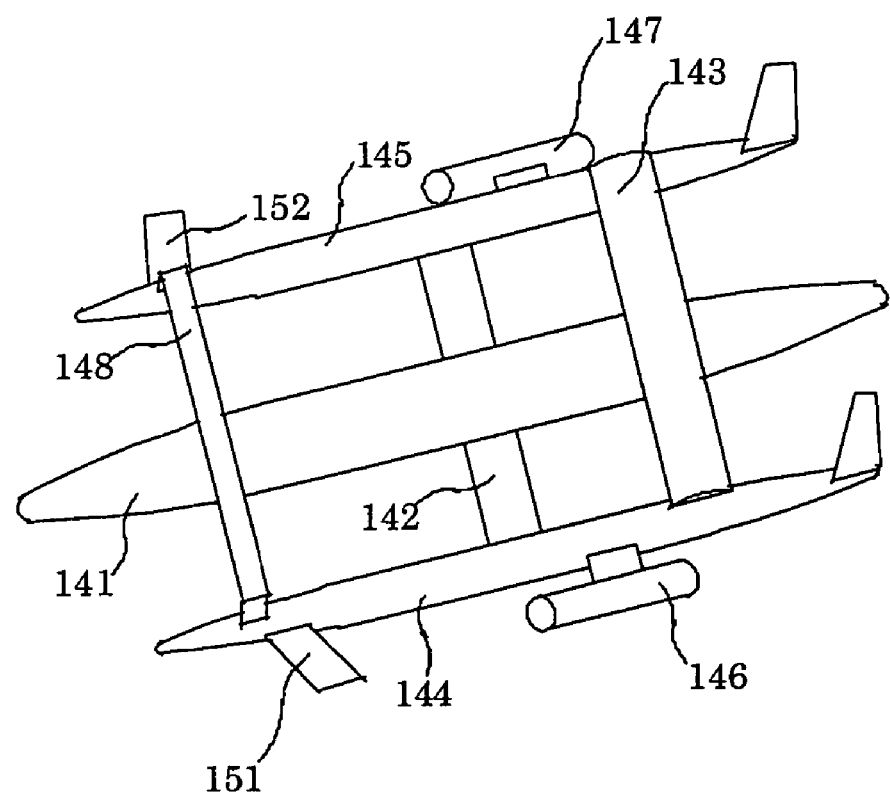
FIG. 13 is a perspective view of the aircraft according to the embodiment 8.
Figure 14:
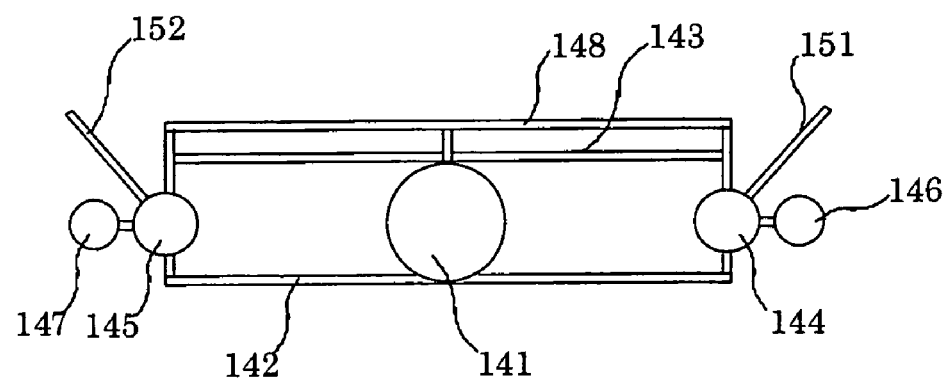
FIG. 14 is a front view of the aircraft according to the embodiment 8, observed from the bow toward the tail wing.
Figure 15:
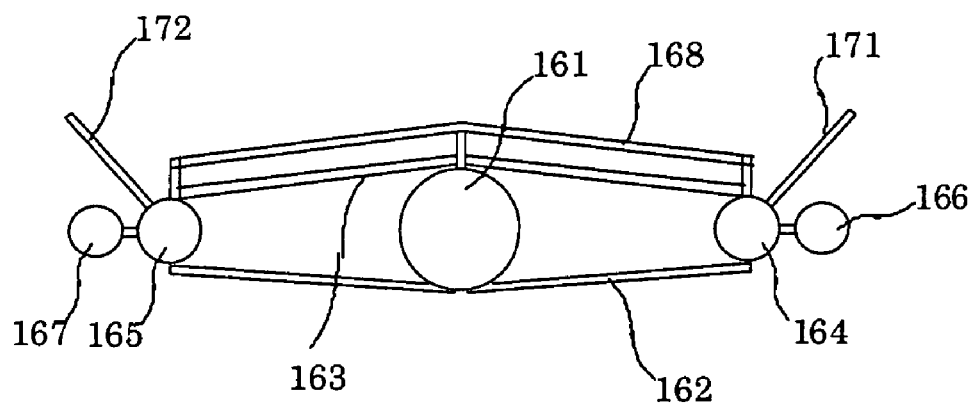
FIG. 15 is a front view of a modification of the aircraft according to the embodiment 8, observed from the bow toward the tail wing.

The aircraft shown in FIG. 13 has a main body 141, sub bodies 144 and 145, main wings 142 and 143, engines 146 and 147, a first canard 148, and second canards 151 and 152. In this embodiment, the first canard 148 is positioned above the main body 141 and the sub bodies 144 and 145. As shown in FIG. 14, the position of the first canard 148 is so high that turbulence caused by this canard less influences the main wing 142. In addition, it is advantageous in that vehicles for transporting cargos can pass under the canard, without folding the first canard 148. The aircraft shown in FIG. 15 has a main body 161, sub bodies 165 and 166, main wings 162 and 163, engines 166 and 167, a first canard 168, and second canards 171 and 172. If the canards and main wings are inclined as shown in this figure, a similar advantage to the above can be attained.

(Embodiment) 9

Figure 16:
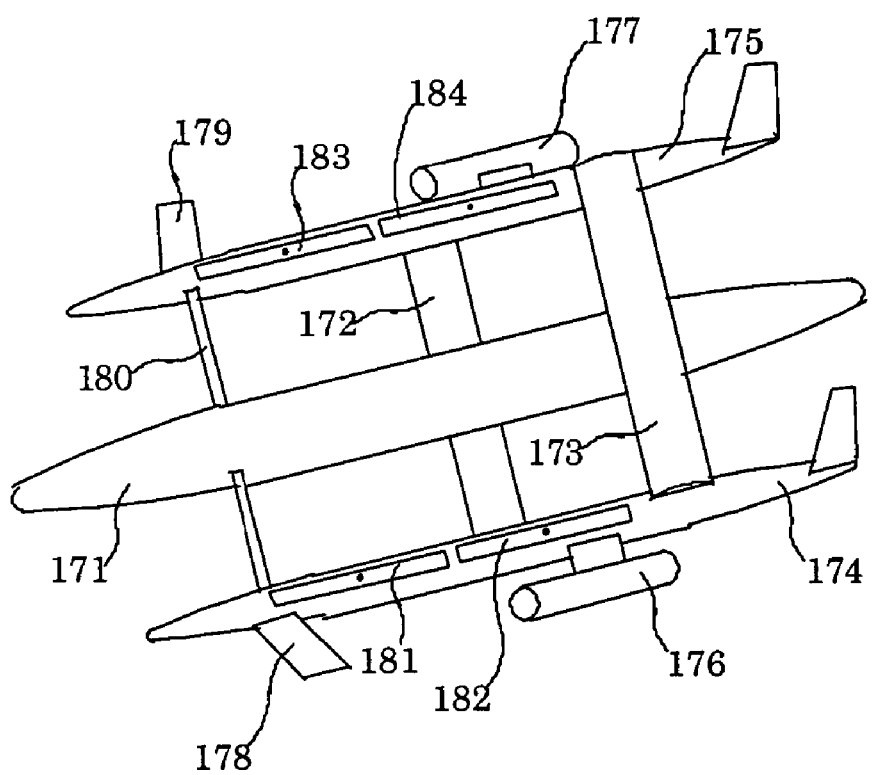
FIG. 16 is a perspective view showing a state of the aircraft according to the embodiment 9.
Figure 17:
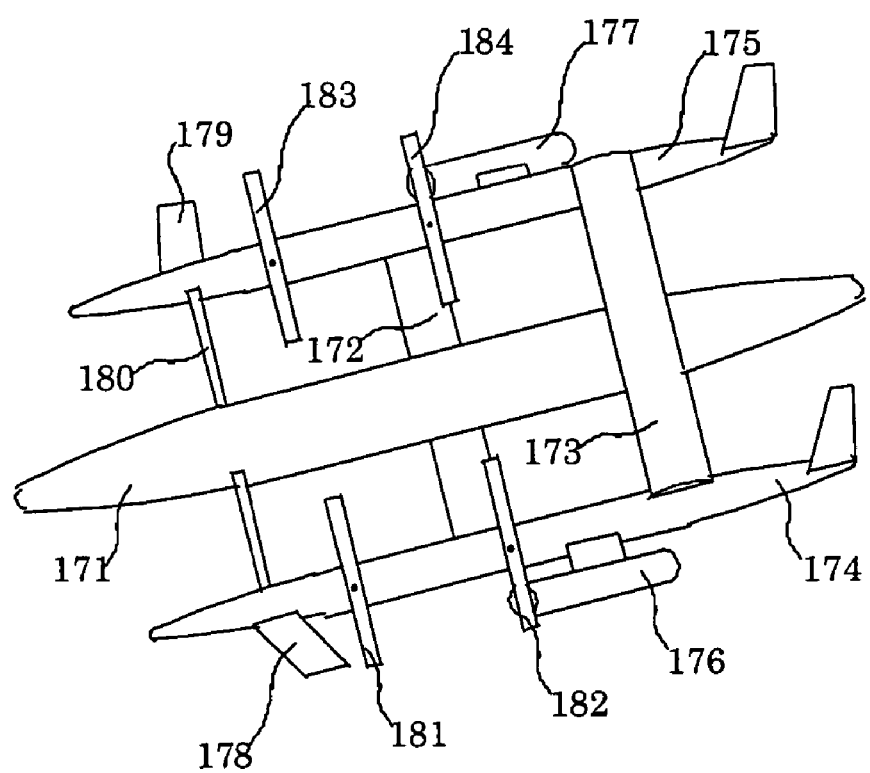
FIG. 17 is a perspective view showing another state of the aircraft according to the embodiment 9.

This aircraft has a main body 171, sub bodies 174 and 175, main wings 172 and 173, engines 176 and 177, a first canard 180, and second canards 178 and 179. The main body 171 is loaded with cargos. Small wings 181 to 184 are provided at several positions of the sub bodies 174 and 175. These small wings have their rotation axes vertical to the sub bodies 174 and 175, and rotate in a plane substantially parallel to the wing 172 and the like. The small wings can also be fixed in specific attitudes during flight. During flight at a high speed, the small wings 181 to 184 are set in the attitude shown in FIG. 16, which causes less resistance. During flight at a low speed, these small wings are rotated by 90° into the attitude shown in FIG. 17. In the attitude shown in FIG. 17, the small wings 181 to 184 increase their lift. As a result, safe flight can be assured at a low speed, and the taxiing distance can be shortened. After the aircraft reaches a flight speed at which the aircraft can bear its dead weight, the small wings may then be brought again into the attitude shown in FIG. 16. During flight at a low speed, the small wings in conjunction with the functions of flaps of the respective wings increase the lift and enables the low-speed flight. Since wings which bear a heavy wing load can be used for the main wings, the aircraft can be manufactured with a structure capable of economical flight.

(Embodiment) 10

Figure 18:
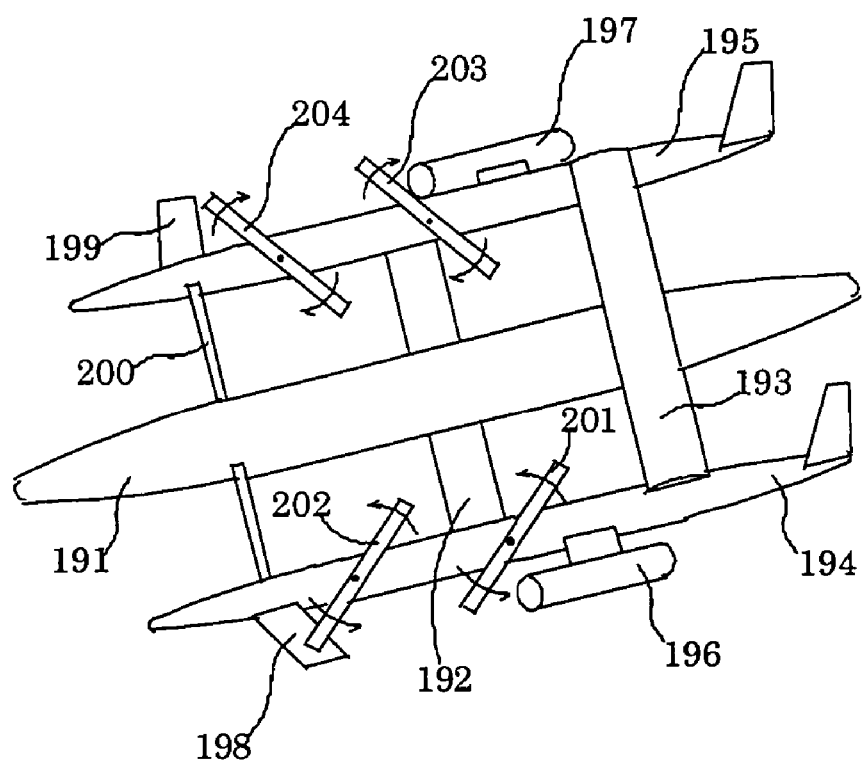
FIG. 18 is a perspective view showing small rotors on sub bodies.

The aircraft shown in FIG. 18 has a main body 191, sub bodies 194 and 195, main wings 192 and 193, engines 196 and 197, a first canard 200, second canards 198 and 199. Rotors 202 to 204 have rotation axes vertical to the sub bodies 194 and 195, and rotate in a plane parallel to the wing 192 and the like. These rotors are used like the embodiment 9 or rotated continuously to increase the lift. Thus, the rotors stabilize flight at a low speed flight or can be used for vertical take-off/landing or the like.

(Embodiment) 11

Figure 19:
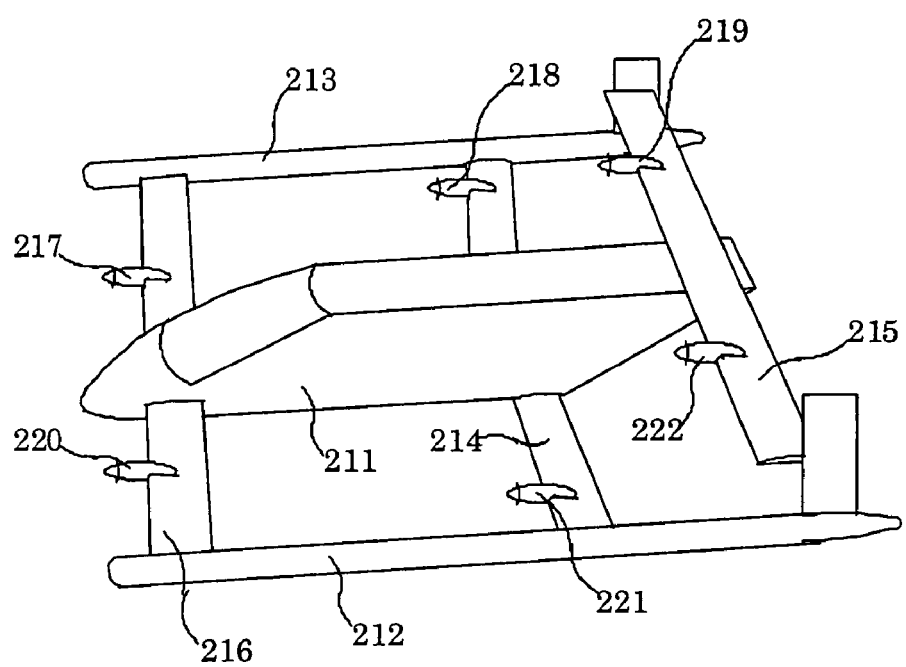
FIG. 19 is a perspective view of the aircraft according to the embodiment 11.

The aircraft shown in FIG. 19 has a main body 211, sub bodies 212 and 213, main wings 214 and 215, and a canard 216. A pair of left and right engines are mounted on every wing. In the aircraft according to this embodiment, the main wings 214 and 215 and the canard 216 can have a substantially equal size. Therefore, every wing can be equipped with any pair of the engines 217 to 222. If a number of engines are thus mounted, higher safety is achieved. As far as the respective wings are so aerodynamically positioned as not to interfere with each other, the canard and the other wings can be equipped with engines. If the engines are positioned near the centerline of the airframe, whichever engine stops does not make much influence upon control of the aircraft.

(Embodiment) 12

Figure 20:
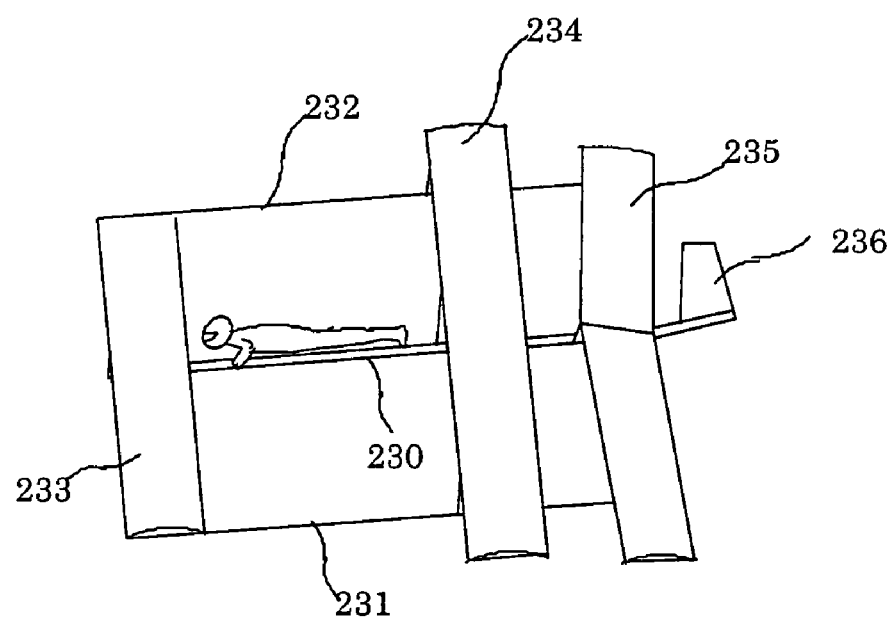
FIG. 20 is a schematic view of a hang glider capable of using three wings having an equal shape.
Figure 21:
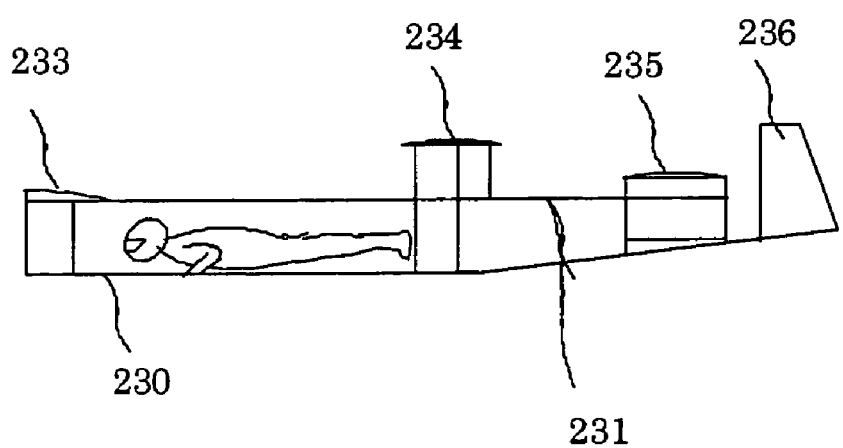
FIG. 21 is a side view of the hang glider.
Figure 22:
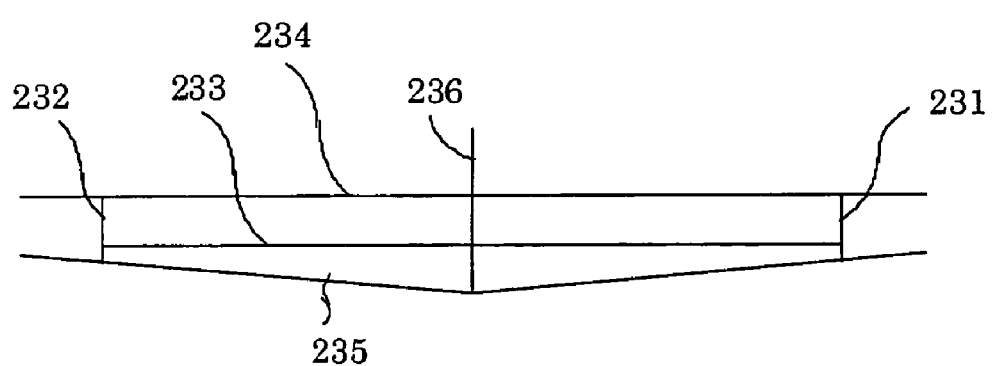
FIG. 22 is a schematic front view of the hang glider.

The aircraft shown in FIG. 20 has a main body 220, sub bodies 231 and 232, main wings 234 and 235, a canard 233, and a tail wing 236. The present invention can be applied to light aircrafts, transport aircrafts, and ultra high-speed aircrafts to manufacture aircrafts capable of economical flight. In addition, as shown in FIGS. 20 to 22, the present invention is applicable to hang gliders. Stable flight is possible if the wings (e.g., the main wings 234 and 235 and the canard 233) are positioned at respectively different heights as shown in FIG. 22.

(Embodiment) 13

Figure 23:
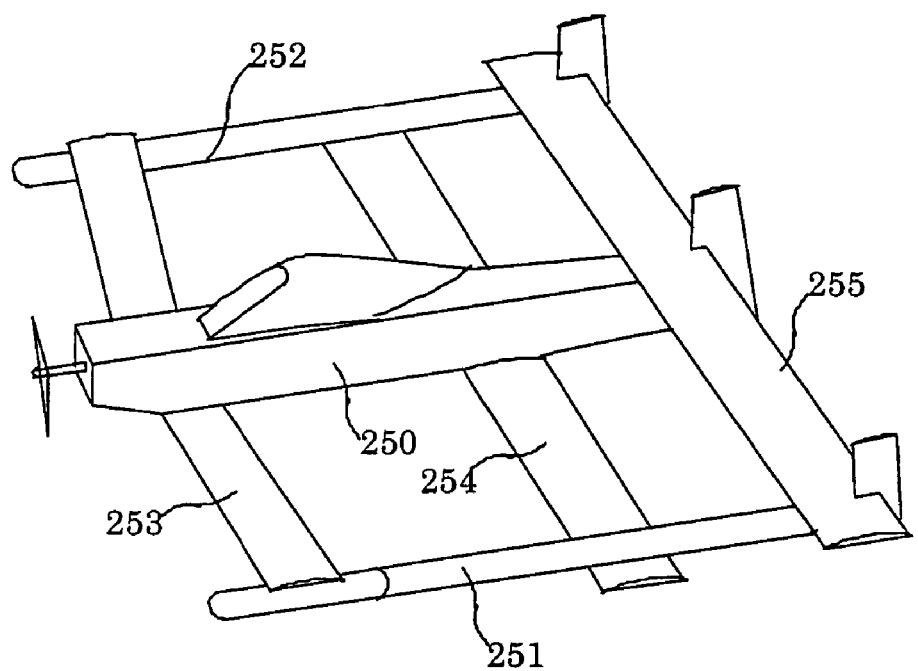
FIG. 23 is a perspective view of the small craft according to the embodiment 13.
Figure 24:
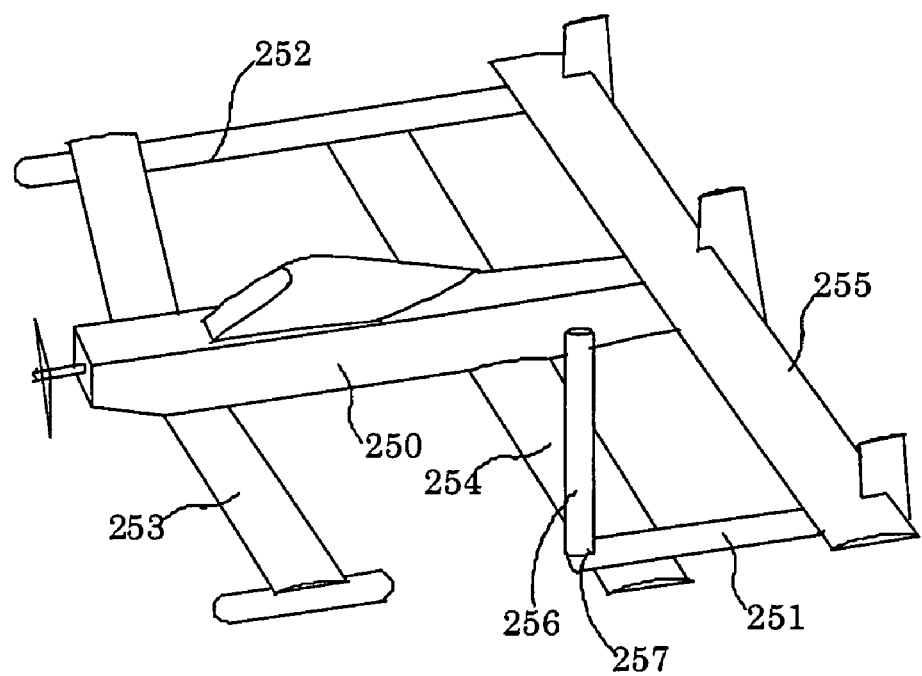
FIG. 24 is a perspective view of the small craft according to the embodiment 13 when crews get on or off the craft.

The aircraft shown in FIG. 23 has a main body 250, sub bodies 251 and 252, main wing 254 and 255. An engine is mounted on the main body 250. The sub bodies 251 and 252 serve as fuel tanks. Since no fuel is loaded in the main body, this is a safe small craft. The sub body 251 has a foldable mechanism 257 as shown in FIG. 24. A part 256 of the sub body 251 is folded by this mechanism to allow crews to get on and off easily.

What is claimed is:

1. An aircraft comprising:
   a main body;
   a first pair of sub bodies positioned respectively in left and right sides of the main body and substantially in parallel with the main body;
   plural wings which are fixed to the main body at central portions of the wings and are also fixed to the sub bodies at those portions of the wings that are close to both left and right ends of the wings;
   another pair of sub bodies positioned in parallel with the main body, respectively in both left and right sides of the main body and the first pair of sub bodies, and engines respectively mounted on outer surfaces of the sub bodies, wherein
   the sub bodies are thinner than the main body,
   one or the wings, which is positioned closest to the fore end of the aircraft among the wings and serves as a first canard, has a shorter wing span than the other wings, and
   fuel is contained in the sub bodies and is supplied to the engines mounted on the sub bodies.

2. An aircraft comprising:
   a main body;
   a first pair of sub bodies positioned respectively in left and right sides of the main body and substantially in parallel with the main body;
   plural wings which are fixed to the main body at central portions of the wings and are also fixed to die sub bodies at chose portions of the wings that are close to both left and right ends of the wings; and
   engines respectively mounted on outer surfaces of the sub bodies, wherein
   the sub bodies are thinner than the main body,
   a second canard having a longer wing span than the first canard is provided on outer surfaces of the sub bodies, near both left and right ends of the first canard,
   one of the wings, which is positioned closest to the fore end of the aircraft among the wings and serves as a first canard, has a shorter wing span than the other wings, and
   fuel is contained in the sub bodies and is supplied to the engines mounted on the sub bodies.

3. An aircraft comprising:
   a main body;
   a first pair of sub bodies positioned respectively in left and right sides of the main body and substantially in parallel with the main body;
   plural wings which are fixed to the main body at central portions of the wings and are also fixed to the sub bodies at those portions of the wings that are close to both left and right ends of the wings; and
   engines respectively mounted on outer surfaces of the sub bodies, wherein
   the sub bodies are thinner than the main body, plural first canards are provided,
   one of the wings, which is positioned closest to the fore end of the aircraft among the wings and serves as a first canard, has a shorter wing span than the other wings, and
   fuel is contained in the sub bodies and is supplied to the engines mounted on the sub bodies.

4. An aircraft comprising:
   a main body;
   a first pair of sub bodies positioned respectively in left and right sides of the main body and substantially in parallel with the main body;
   plural wings which are fixed to the main body at central portions of the wings and are also fixed to the sub bodies at those portions of the wings that are close to both left and right ends of the wings; and
   engines respectively mounted on outer surfaces of the sub bodies, wherein
   the sub bodies are thinner than the main body, a detachable mechanism is provided to separate a part of the first canard from the main body or the sub bodies,
   one of the wings, which is positioned closest to the fore end of the aircraft among the wings and serves as a first canard, has a shorter wing span than the other wings, and fuel is contained in the sub bodies and is supplied to the engines mounted on the sub bodies.

5. An aircraft comprising:

a main body;

a first pair of sub bodies positioned respectively in left and right sides of the main body and substantially in parallel with the main body;

plural wings which are fixed to the main body at central portions of the wings and are also fixed to the sub bodies at those portions of the wings that are close to both left and right ends of the wings; and engines respectively mounted on outer surfaces of the sub bodies, wherein the sub bodies are thinner than the main body, a foldable mechanism which allows a part of the sub bodies to be folded so as to widen the distance between the main body and the part of the sub bodies is provided at a spot at which the part of the first canard is separated, one of the wings, which is positioned closest to the fore end of the aircraft among the wings and serves as a first canard, has a shorter wing span than the other wings, and fuel is contained in the sub bodies and is supplied to the engines mounted on the sub bodies.

6. An aircraft comprising:

a main body;

a first pair of sub bodies positioned respectively in left and tight sides of the main body and substantially in parallel with the main body;

plural wings which are fixed to the main body at central portions of the wings and are also fixed to the sub bodies at those portions of the wings that are close to both left and right ends of the wings; and engines respectively mounted on outer surfaces of the sub bodies, wherein the sub bodies are thinner than the main body, the sub bodies are equipped with wings, which has a rotation axis vertical to the sub bodies and rotates in a plane parallel to the other wings, the small wing being fixed in an arbitrary attitude during flight, one of the wings, which is positioned closest to the fore end of the aircraft among the wings and serves as a first canard, has a shorter wing span than the other wings, and fuel is contained in the sub bodies and is supplied to the engines mounted on the sub bodies.

7. An aircraft comprising:

a main body;

a pair of sub bodies positioned respectively in left and right sides of the main body and substantially in parallel with the main body;

plural wings which are fixed to the main body at central portions of the wings and are also fixed to the sub bodies at those portions of the wings that are close to both ends of the wings; and engines respectively mounted on outer surfaces of the sub bodies, wherein the sub bodies are thinner than the main body, and in a side close to the fore end of the aircraft, spaces are provided between the main body and the sub bodies, and canards each having a long wing span are provided on the outer surfaces of the sub bodies in the side close to the fore end of the aircraft.

8. The aircraft according to claim 7, wherein one or more rods linking the main body to the sub bodies are provided in the spaces as linking parts.

9. The aircraft according to claim 7, fuel is contained in the sub bodies and is supplied to the engines mounted on the sub bodies.

10. The aircraft according to claim 7, further comprising another pair of sub bodies positioned in parallel with the main body, respectively in both left and right sides of the main body and the first pair of sub bodies.

11. The aircraft according to claim 7, wherein the plural wings are positioned respectively at different heights where the aircraft is observed in a front view.

12. The aircraft according to claim 7, wherein a foldable mechanism which allows a part of the sub bodies to be folded so as to widen the distance between the main body and the part of the sub bodies is provided at a spot at which the part of the first canard is separated.

* * * * *